(12) United States Patent
Xue et al.

(10) Patent No.: US 9,515,508 B2
(45) Date of Patent: Dec. 6, 2016

(54) BATTERY MANAGEMENT SYSTEM

(71) Applicant: O2Micro Inc., Santa Clara, CA (US)

(72) Inventors: Weidong Xue, Shanghai (CN); Anquan Xiao, Shanghai (CN); Xiaohu Tang, Shanghai (CN); Xiaofei Gong, Shanghai (CN)

(73) Assignee: O2Micro Inc, Santa Clara, CA (US)

( * ) Notice: Subject to any disclaimer, the term of this patent is extended or adjusted under 35 U.S.C. 154(b) by 319 days.

(21) Appl. No.: 13/804,594

(22) Filed: Mar. 14, 2013

(65) Prior Publication Data

US 2014/0203782 A1 Jul. 24, 2014

(30) Foreign Application Priority Data

Jan. 24, 2013 (CN) .......................... 2013 1 0027806

(51) Int. Cl.
*H02J 7/00* (2006.01)
*H01M 10/48* (2006.01)
*H01M 10/42* (2006.01)

(52) U.S. Cl.
CPC .............. *H02J 7/007* (2013.01); *H02J 7/0014* (2013.01); *H01M 10/482* (2013.01); *H01M 2010/4271* (2013.01); *H02J 7/0016* (2013.01); *H02J 7/0018* (2013.01); *H02J 2007/0037* (2013.01)

(58) Field of Classification Search
CPC ...................................... H02J 7/007
USPC ......................................... 320/134
See application file for complete search history.

(56) References Cited

U.S. PATENT DOCUMENTS 5,493,197 A * 2/1996 Eguchi ................... H02J 7/0031
320/116
5,754,027 A 5/1998 Oglesbee et al.
6,008,623 A * 12/1999 Chen ..................... H02J 7/0016
320/118
6,114,835 A * 9/2000 Price ..................... H02J 7/0018
320/118
6,157,165 A 12/2000 Kinoshita et al.
6,285,161 B1 9/2001 Popescu
(Continued)

FOREIGN PATENT DOCUMENTS

CN 1512644 A 7/2004
CN 1221880 C 10/2005
(Continued)

OTHER PUBLICATIONS

OZ872/873, "Protection and Charging IC for Lithium-Ion Battery Pack" copyright Mar. 2002 by O2Micro (15 page).

*Primary Examiner* — Samuel Berhanu
*Assistant Examiner* — Tessema Kebede

(57) ABSTRACT

A battery management system includes detecting circuitry and control circuitry coupled to the detecting circuitry. The detecting circuitry detects cell voltages of battery cells of a battery pack. The control circuitry alternates between a normal state and a charging prohibition state. In the normal state, charging of the battery cells is enabled and the cell voltages increase, and if a voltage of a battery cell of the battery cells exceeds a predetermined overcharge threshold, then the control circuitry transitions to the charging prohibition state. In the charging prohibition state, charging of the battery cells is disabled, and the voltage of the battery cell decreases if at least one cell of the battery cells has a voltage less than a balance threshold. If the voltage of the battery cell falls to a predetermined overcharge-released threshold, then the control circuitry transitions to the normal state and enables charging of the battery cells.

20 Claims, 5 Drawing Sheets

(56) References Cited

U.S. PATENT DOCUMENTS

| | | | |
|---|---|---|---|
| 6,356,055 B1 | 3/2002 | Lin et al. | |
| 6,373,225 B1 * | 4/2002 | Haraguchi | H02J 7/0016 320/122 |
| 6,377,024 B1 * | 4/2002 | Choy | H02J 7/0018 320/116 |
| 6,700,766 B2 | 3/2004 | Sato | |
| 7,471,064 B2 | 12/2008 | Sobue et al. | |
| 8,288,999 B2 | 10/2012 | Hsu et al. | |
| 2003/0076642 A1 | 4/2003 | Shiner et al. | |
| 2005/0112420 A1 | 5/2005 | Lai et al. | |
| 2005/0127873 A1 * | 6/2005 | Yamamoto | H02J 7/0016 320/116 |
| 2008/0088277 A1 | 4/2008 | Wang et al. | |
| 2009/0079391 A1 | 3/2009 | Lupu et al. | |
| 2009/0091294 A1 | 4/2009 | Gong et al. | |
| 2009/0096420 A1 * | 4/2009 | Lupu et al. | 320/122 |
| 2009/0278489 A1 | 11/2009 | St-Jacques | |
| 2010/0023285 A1 * | 1/2010 | Nakanishi | 702/63 |
| 2010/0090653 A1 * | 4/2010 | Kuwano et al. | 320/136 |
| 2010/0201317 A1 | 8/2010 | Shiu et al. | |
| 2011/0156656 A1 * | 6/2011 | Saito | H02J 7/0031 320/134 |

FOREIGN PATENT DOCUMENTS

| | | |
|---|---|---|
| CN | 2790010 Y | 6/2006 |
| CN | 101277022 A | 10/2008 |
| CN | 101599658 A | 12/2009 |
| CN | 101867199 A | 10/2010 |
| CN | 102570551 A | 7/2012 |
| EP | 2065962 A1 | 6/2009 |
| JP | 2005151720 A | 6/2005 |
| JP | 2009081989 A | 4/2009 |
| JP | 2009135064 A | 6/2009 |
| TW | 472426 B | 1/2002 |
| TW | M433677 * | 7/2012 |
| TW | M433677 U1 | 7/2012 |

* cited by examiner

BATTERY MANAGEMENT SYSTEM

RELATED APPLICATION

The present application claims priority to Patent Application No. 201310027806.5, filed on Jan. 24, 2013, with the State Intellectual Property Office of the People's Republic of China.

BACKGROUND

A battery pack, e.g., a lithium-ion battery pack, lead-acid battery pack, or the like, usually includes a group of battery cells coupled in series. When the battery cells are charged to above an overcharge voltage, characteristics of the battery pack may be degraded and safety of the battery pack may be diminished. When the battery cells are unbalanced because one or more cells of the battery cells have cell voltages exceeding a balance threshold, performance of the battery pack may be affected. Therefore, there is a demand for a battery management system to manage the battery cells of the battery pack, to ensure adequate characteristics, safety and performance of the battery pack. As to the battery management system itself, high efficiency is desirable.

SUMMARY

In one embodiment, a battery management system includes detecting circuitry and control circuitry coupled to the detecting circuitry. The detecting circuitry detects cell voltages of battery cells of a battery pack. The control circuitry alternates between a normal state and a charging prohibition state. In the normal state, charging of the battery cells is enabled and the cell voltages increase, and if a voltage of a battery cell of the battery cells exceeds a predetermined overcharge threshold, then the control circuitry transitions to the charging prohibition state. In the charging prohibition state, charging of the battery cells is disabled, and the voltage of the battery cell decreases if at least one cell of the battery cells has a voltage less than a balance threshold. If the voltage of the battery cell falls to a predetermined overcharge-released threshold, then the control circuitry transitions to the normal state and enables charging of the battery cells.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, a battery management system compares cell voltages of battery cells with a predetermined overcharge threshold and a predetermined overcharge-released threshold that is less than the predetermined overcharge threshold, and generates comparison information. The battery management system also selectively increases or decreases some of the cell voltages of the battery cells based on the comparison information such that the battery cells are protected from an overcharge condition and the cell voltages of the battery cells are balanced relative to one another. Advantageously, the battery management system of the present invention can enhance the efficiency of the charging process and the balancing process, and ensure that characteristics, safety, and performance of the battery cells are adequate.

Figure 1A:
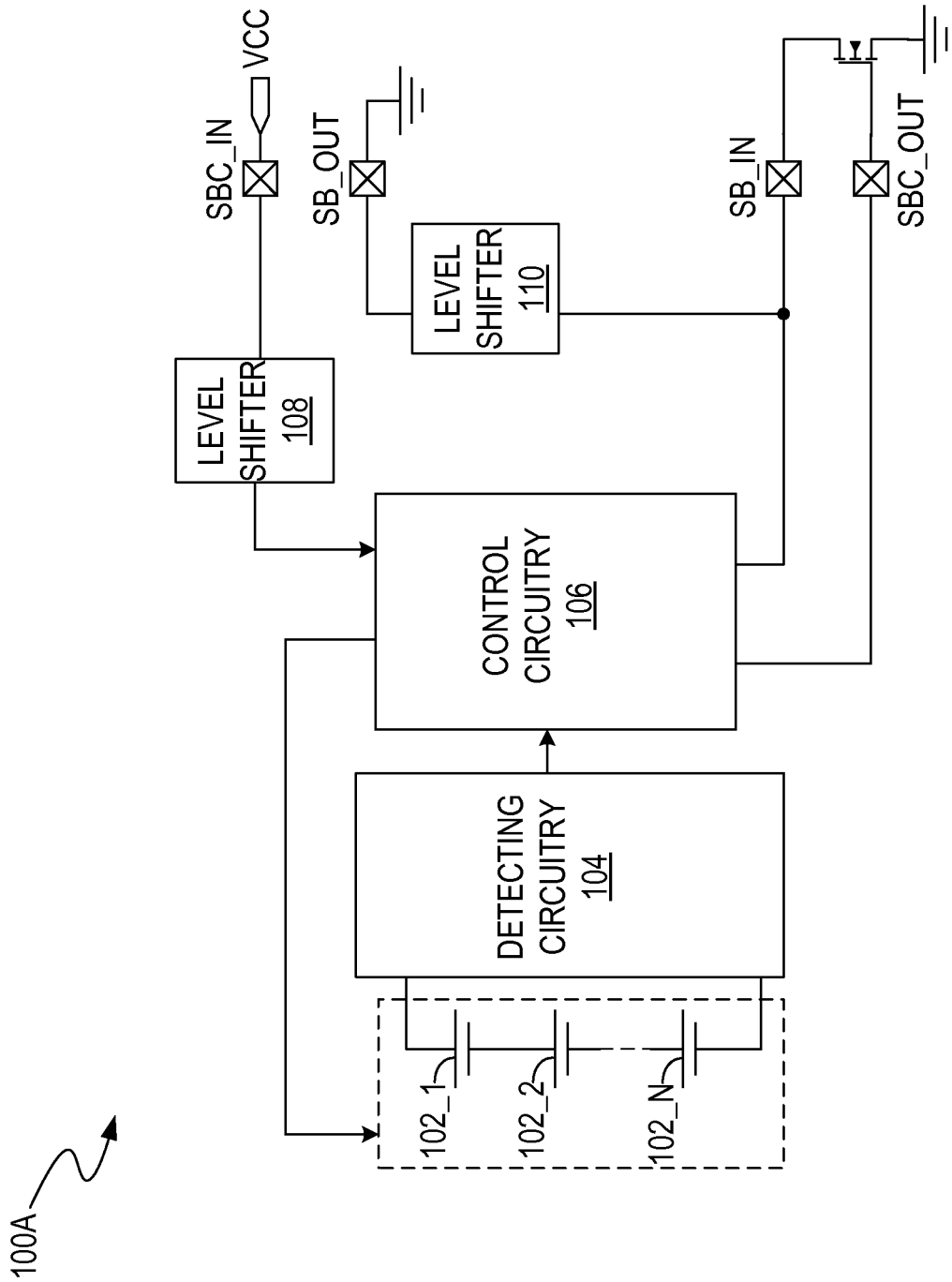
FIG. 1A illustrates a block diagram of an example of a battery management system, in an embodiment according to the present invention.

FIG. 1A illustrates a block diagram of an example of a battery management system 100A, in an embodiment according to the present invention. The charge management system 100A includes detecting circuitry 104 and control circuitry 106. The battery management system 100A can manage charging of battery cells 102_1-102_N. In one embodiment, the battery management system 100A and the battery cells 102_1-102_N are assembled into a battery pack. The battery cells 102_1-102_N can be, but are not limited to, lithium-ion battery cells, nickel-cadmium battery cells, lead-acid battery cells, or solar battery cells. The battery cells 102_1-102_N are coupled in series.

The detecting circuitry 104 coupled to the battery cells 102_1-102_N is operable for detecting cell voltages, e.g., $V_{102\_1}, V_{102\_2}, \ldots, V_{102\_N}$, of the battery cells 102_1-102_N. The control circuitry 106 coupled to the detecting circuitry 104 alternately operates either in a normal state (or a charge state) or in a charging prohibition state by comparing a voltage $V_{102\_K}$ of a battery cell 102_K (K=1, 2, ..., N) with a predetermined overcharge threshold $V_{OV}$ and a predetermined overcharge-released threshold $V_{OVR}$ ($V_{OVR} < V_{OV}$). More specifically, in the normal state, charging of the battery cells 102_1-102_N is enabled and the cell voltages of the battery cells 102_1-102_N increase. If a voltage $V_{102\_K}$ of a battery cell 102_K exceeds the predetermined overcharge threshold $V_{OV}$, the control circuitry 106 transitions to the charging prohibition state. In the charging prohibition state, charging of the battery cells 102_1-102_N is disabled. In the charging prohibition state, the voltage $V_{102\_K}$ of the battery cell 102_K decreases if the battery cells 102_1-102_N are unbalanced, e.g., at least one cell of the battery cells 102_1-102_N has a cell voltage less than a balance threshold $V_{TH}$ and at least one cell of the battery cells 102_1-102_N has a cell voltage greater than the balance threshold $V_{TH}$ ($V_{TH} < V_{OVR} < V_{OV}$); or the cell voltages of the battery cells 102_1-102_N remain unchanged if the battery cells 102_1-102_N are balanced and fully charged. If the voltage $V_{102\_K}$ of the battery cell 102_K falls to the predetermined overcharge-released threshold $V_{OVR}$, the control circuitry 106 transitions to the normal state and enables charging of the battery cells 102_1-102_N. In one embodiment, the predetermined overcharge-released threshold $V_{OVR}$ is less than the predetermined overcharge threshold $V_{OV}$ and is greater than the balance threshold $V_{TH}$.

Figure 1B:
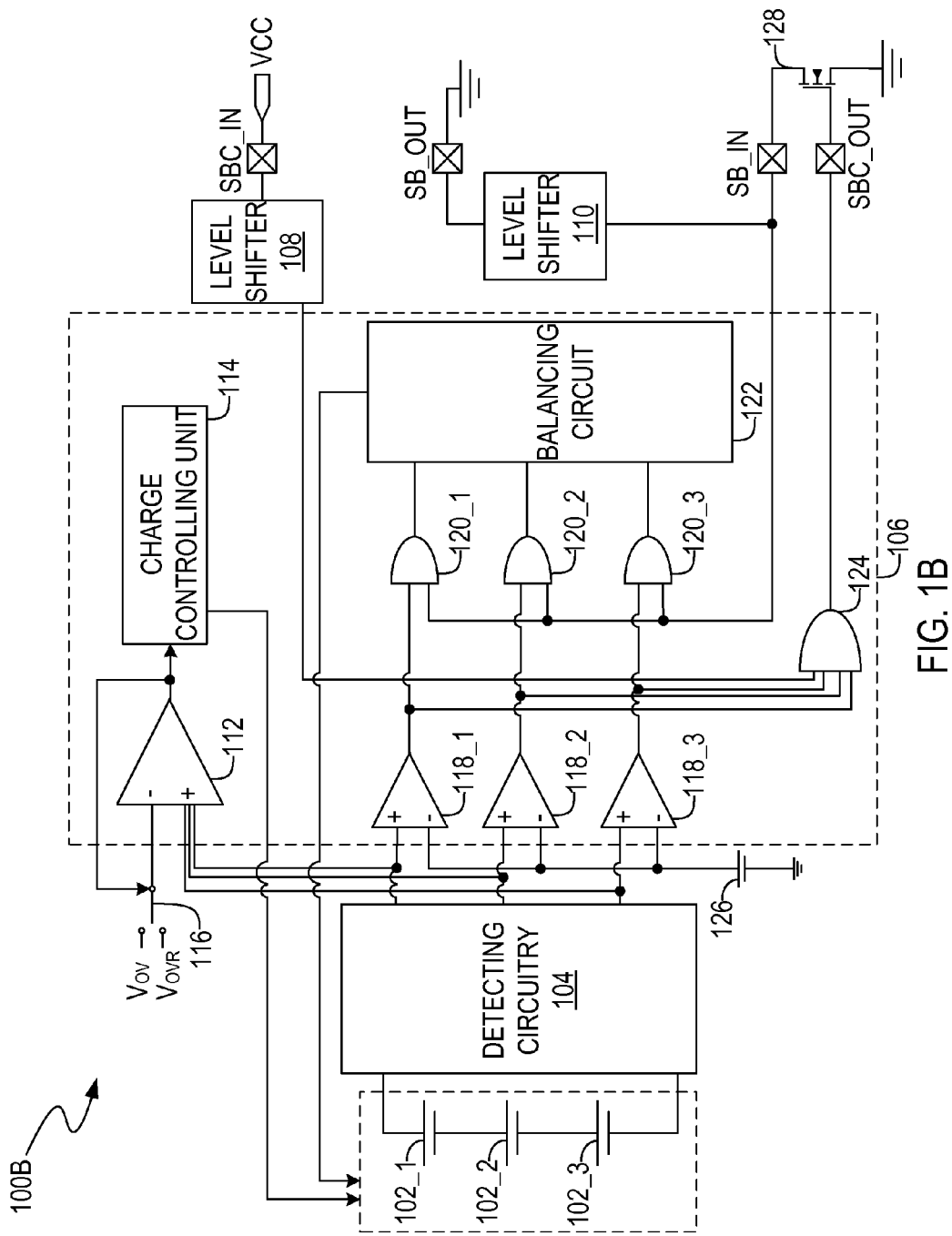
FIG. 1B illustrates a circuit diagram of an example of a battery management system, in an embodiment according to the present invention.

FIG. 1B illustrates a circuit diagram of an example of a battery management system 100B, in an embodiment according to the present invention. FIG. 1B is described in combination with FIG. 1A. In the example of FIG. 1B, three battery cells 102_1-102_3 are disclosed; however, the number of battery cells can be other than three.

In one embodiment, the control circuitry 106 includes a comparator 112 and a charge controlling unit 114. Non-inverting input terminals of the comparator 112 are coupled to the detecting circuitry 104 and obtain cell voltages of battery cells 102_1-102_3 from the detecting circuitry 104. An inverting input terminal of the comparator 112 is coupled to an output terminal of a voltage selector 116, e.g., an SPDT (single pole double throw) switch, or a two-switch multiplexer, or the like. An output terminal of the comparator 112 is coupled to the charge controlling unit 114. The charging controlling unit 114 can be coupled to a charger (not shown in FIG. 1B) to control charging of the battery cells 102_1-102_3. The control circuitry 106 further includes comparators 118_1-118_3, AND gates 120_1-120_3, a balancing circuit 122, and a balancing prohibition unit 124. Non-inverting input terminals of the comparators 118_1-118_3 are coupled to the detecting circuitry 104 and obtain cell voltages of the battery cells 102_1-102_3 respectively, e.g., the non-inverting input terminal of the comparator 118_1 obtains the cell voltage $V_{102\_1}$ of the battery cell 102_1 from the detecting circuitry 104. Inverting input terminals of the comparators 118_1-118_3 are coupled to a reference source 126. Output terminals of the comparators 118_1-118_3 are coupled to input terminals of the AND gates 120_1-120_3, respectively, e.g., the output terminal of the comparator 118_1 is coupled to an input terminal of the AND gate 120_1. A signal from an SB_IN terminal is also coupled to the input terminals of the AND gates 120_1-120_3. Output terminals of the AND gates 120_1-120_3 are coupled to the balancing circuit 122. Output terminals of the comparators 118_1-118_3 are also coupled to input terminals of the balancing prohibition unit 124. An output terminal of the balancing prohibition unit 124 is coupled to an SBC_OUT terminal. In one embodiment, the balancing prohibition unit 124 is an AND gate.

In one embodiment, the reference source 126 generates a balance threshold $V_{TH}$ to inverting input terminals of the comparators 118_1-118_3. Each of the comparators 118_1-118_3 compares a corresponding cell voltage of a battery cell with the balance threshold $V_{TH}$, e.g., the comparator 118_1 compares the cell voltage $V_{102\_1}$ of the battery cell 102_1 with the balance threshold $V_{TH}$. Each of the AND gates 120_1-120_3 receives an output signal of a corresponding comparator of the comparators 118_1-118_3 and receives a signal from the SB_IN terminal, e.g., the AND gate 120_1 receives the output signal of the comparator 118_1 and the signal from the SB_IN terminal. The balancing circuit 122 receives output signals of the AND gates 120_1-120_3. In one embodiment, if an AND gate 120_i (i=1, 2, 3) outputs a logic-high signal, e.g., indicating that the cell voltage of the battery cell 102_i is greater than the balance threshold $V_{TH}$, then the balancing circuit 122 balances the battery cells 102_1-102_3 by turning on a bypass circuit (not shown in FIG. 1B) coupled in parallel with the battery cell 102_i.

The balancing prohibition unit 124 receives output signals of the comparators 118_1-118_3 and receives an enable signal from an SBC_IN terminal via a level shifter 108. A switch 128 is coupled between the SB_IN terminal and the ground. The switch 128 can be, but is not limited to, a metal-oxide-semiconductor field-effect transistor (MOSFET). A conductance status of the switch 128 is determined by its gate-to-source voltage, which is determined by an output signal of the balancing prohibition unit 124. In one embodiment, if the output signal of the balancing prohibition unit 124 is logic high, the switch 128 is turned on. Thus, the AND gates 120_1-120_3 can receive a logic-low signal via the switch 128 and provide logic-low signals to the balancing circuit 122. As such, the balancing of the battery cells 102_1-102_3 can be disabled if the balancing prohibition unit 124 outputs, e.g., a logic-high signal.

In the example of FIG. 1B, a first reference source (not shown in FIG. 1B) generates a predetermined overcharge threshold $V_{OV}$, a second reference source (not shown in FIG. 1B) generates a predetermined overcharge-released threshold $V_{OVR}$, and the predetermined overcharge threshold $V_{OV}$ and overcharge-released threshold $V_{OVR}$ are provided to the voltage selector 116. The voltage selector 116 can select one of the thresholds $V_{OV}$ and $V_{OVR}$ to be provided to the comparator 112. In one embodiment, the predetermined overcharge-released threshold $V_{OVR}$ is greater than the balance threshold $V_{TH}$ and is less than the predetermined overcharge threshold $V_{OV}$ ($V_{TH} < V_{OVR} < V_{OV}$). At the beginning of the controlling process, the predetermined overcharge threshold $V_{OV}$ is selected to be provided to the inverting input terminal of the comparator 112. The comparator 112 compares cell voltages $V_{102\_1}$, $V_{102\_2}$ and $V_{102\_3}$ of the battery cells 102_1-102_3 with the predetermined overcharge threshold $V_{OV}$ and generates an output signal. The charging controlling unit 114 controls charging of the battery cells 102_1-102_3 based on the output signal. If a voltage $V_{102\_A}$ of a battery cell 102_A (A=1, 2, 3) is greater than the predetermined overcharge threshold $V_{OV}$, the output signal of the comparator 112 is logic high, in one embodiment. In response to this logic-high output signal from the comparator 112, the predetermined overcharge-released threshold $V_{OVR}$ is selected to be provided to the inverting input terminal of the comparator 112. Additionally, this output signal of the comparator 112 controls the charge controlling unit 114 to disable charging of the battery cells 102_1-102_3. In other words, the battery management system 100B enters a charging prohibition state.

In the charging prohibition state, the balancing circuit 122 balances the battery cells 102_1-102_3 by discharging those battery cells, including the battery cell 102_A, whose cell voltages are greater than the balance threshold $V_{TH}$ if at least one cell of the battery cells 102_1-102_3 has a voltage less than the balance threshold $V_{TH}$. The voltage $V_{102\_A}$ of the battery cell 102_A decreases. When the voltage $V_{102\_A}$ is less than the predetermined overcharge-released threshold $V_{OVR}$, the comparator 112 outputs, e.g., a logic-low signal, to the charge controlling unit 114. The charge controlling unit 114 resumes charging of the battery cells 102_1-102_3. In other words, the battery management system 100B enters a normal state.

In one embodiment, the SBC_IN terminal receives an input voltage VCC (as shown in FIG. 1B). Thus, the balancing prohibition unit 124 can receive a logic-high signal from the SBC_IN terminal via the level shifter 108. The output signal of the balancing prohibition unit 124 is determined by output signals of the comparators 118_1-118_3. The comparators 118_1-118_3 compare cell voltages $V_{102\_1}$, $V_{102\_2}$ and $V_{102\_3}$ of the battery cells 102_1-102_3 with the balance threshold $V_{TH}$ provided by the reference source 126, respectively. If a voltage $V_{102\_B}$ (B=1, 2, 3) of a battery cell 102_B is greater than the balance threshold $V_{TH}$, the comparator 118_B outputs a logic-high signal, otherwise outputs a logic-low signal. In one embodiment, if at least one comparator of the comparators 118_1-118_3 outputs a logic-low signal, then the output signal of the balancing prohibition unit 124 is logic low, and the balancing of the battery cells 102_1-102_3 is not prohibited. In another embodiment, if the comparators 118_1-118_3 all output logic-high signals, then the output signal of the balancing prohibition unit 124 is logic high, and the balancing of the battery cells 102_1-102_3 is disabled/prohibited.

In operation, in one embodiment, the battery management system 100B operates in a normal state initially. In the normal state, the battery cells 102_1-102_3 are charged and the cell voltages $V_{102\_1}$, $V_{102\_2}$ and $V_{102\_3}$ of the battery cells 102_1-102_3 increase. At the beginning of the normal state, cell voltages of some of the battery cells 102_1-102_3 are less than the balance threshold $V_{TH}$, e.g., one or more comparators of the comparators 118_1-118_3 output logic-low signals. As a result, the output signal of the balancing prohibition unit 124 is logic low. The switch 128 is turned off and the signal from the SB_IN terminal is logic high accordingly. Thus, output signals of the AND gates 120_1-120_3 are determined by the output signals of the comparators 118_1-118_3, respectively. If the comparator 118_B (B=1, 2, 3) outputs a logic-high signal, the output signal of the AND gate 120_B is logic high. The balancing circuit 122 balances the battery cells 102_1-102_3 by decreasing a rate of voltage increase of the battery cell 102_B while the battery cell 102_B is being charged, e.g., by turning on the bypass circuit coupled in parallel with the battery cell 102_B.

In one embodiment, if cell voltages $V_{102\_1}$, $V_{102\_2}$ and $V_{102\_3}$, of the battery cells 102_1-102_3 are all greater than the balance threshold $V_{TH}$, then the comparators 118_1-118_3 all output logic-high signals, such that the output signal of the balancing prohibition unit 124 is logic high. The switch 128 is turned on and the signal from the SB_IN terminal is pulled down to logic low. Therefore, the output signals of the AND gates 120_1-120_3 are all logic low. The balancing circuit 122 stops balancing the battery cells 102_1-102_3, e.g., the balancing prohibition unit 124 disables the balancing of the battery cells 102_1-102_3. When the balancing of the battery cells 102_1-102_3 is disabled, charging of the battery cells 102_1-102_3 can continue until the battery cells 102_1-102_3 are fully charged. When the battery cells 102_1-102_3 are fully charged, the battery cells 102_1-102_3 enter a charging prohibition state, e.g., the charging of the battery cells 102_1-102_3 is terminated.

In one embodiment, in the normal state, the predetermined overcharge threshold $V_{OV}$ is selected and provided to the comparator 112, and the comparator 112 compares cell voltages of the battery cells 102_1-102_3 with the predetermined overcharge threshold $V_{OV}$. If a cell voltage $V_{102\_A}$ (A=1, 2, 3) of a battery cell 102_A exceeds the predetermined overcharge threshold $V_{OV}$, the comparator 112 outputs a logic-high signal to the charge controlling unit 114. In response to this logic-high signal, the charge controlling unit 114 disables charging of the battery cells 102_1-102_3, and the battery management system 100B enters a charging prohibition state. In the charging prohibition state, the predetermined overcharge-released threshold $V_{OVR}$ is selected and provided to the comparator 112, and the comparator 112 compares cell voltages of the battery cells 102_1-102_3 with the predetermined overcharge-released threshold $V_{OVR}$. During the charging prohibition state, the charging of the battery cells 102_1-102_3 is disabled, the balancing process is continued by the balancing circuit 122, and the cell voltage $V_{102\_A}$ of the battery cell 102_A decreases because, e.g., a bypass circuit coupled in parallel with the battery cell 102_A is turned on. When the cell voltage $V_{102\_A}$ of the battery cell 102_A falls to the predetermined overcharge-released threshold $V_{OVR}$, the comparator 112 outputs a logic-low signal to the charge controlling unit 114. In response to this logic-low signal, the charge controlling unit 114 enables charging of the battery cells 102_1-102_3 again, and the battery management system 100B enters a normal state.

Consequently, the battery management system 100B, e.g., the control circuitry 106, can operate alternately in the normal state or the charging prohibition state. During the normal state and the charging prohibition state, the balancing circuit 122 can keep balancing the battery cells 102_1-102_3 until the battery cells 102_1-102_3 are balanced to one another. In one embodiment, if the cell voltages of the battery cells 102_1-102_3 are greater than the balance threshold $V_{TH}$, the balancing circuit 122 stops balancing the battery cells 102_1-102_3 and the battery cells 102_1-102_3 are balanced to one another.

Advantageously, by alternately operating in the normal state or the charging prohibition state, the battery cells can be protected from an overcharge condition; and by balancing the battery cells during the normal state and the charging prohibition state, the battery cells can be balanced relative to one another. The battery management system 100B can enhance the efficiency of the balancing process and the charging process.

Figure 2:
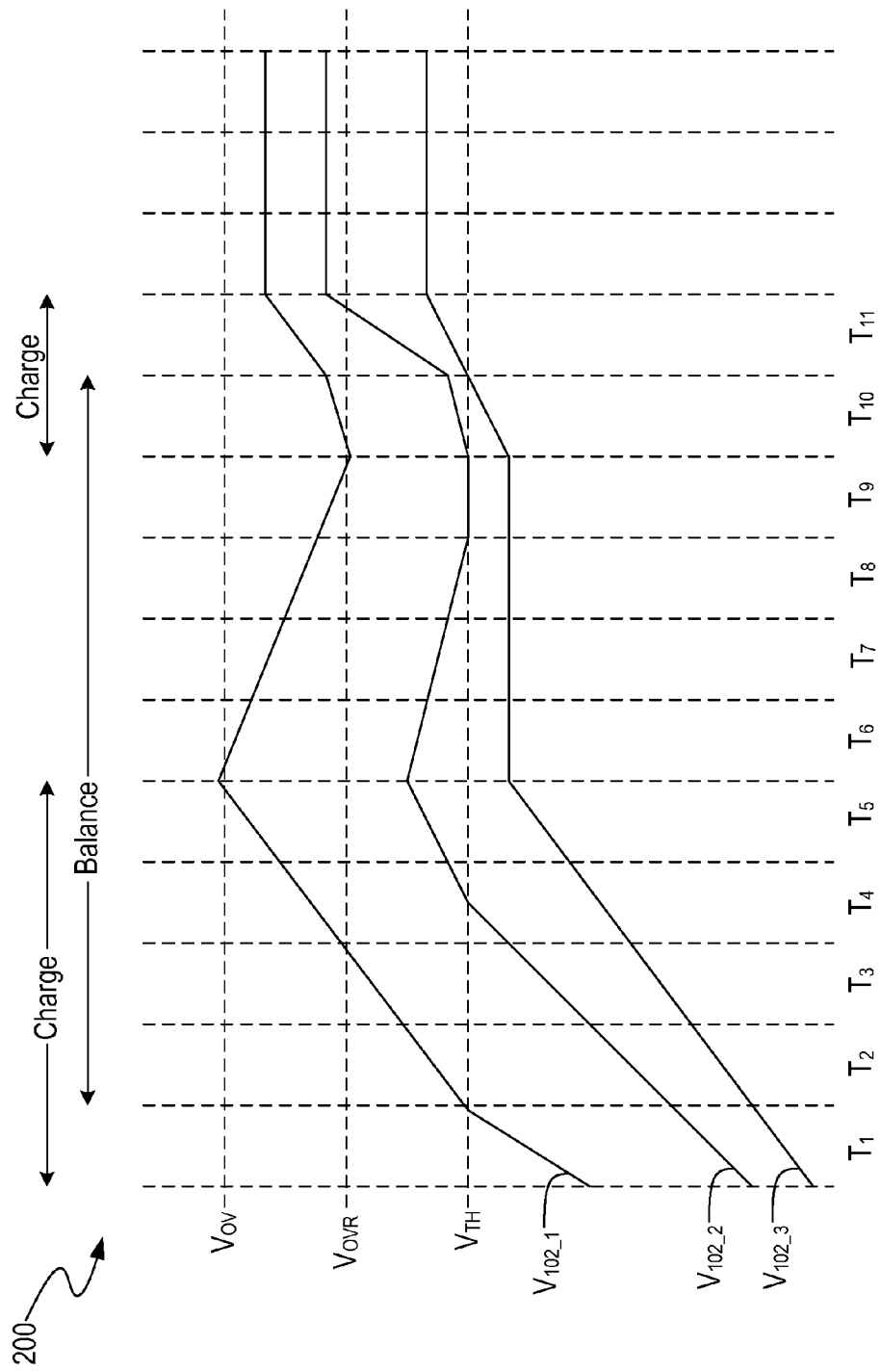
FIG. 2 illustrates a timing diagram of examples of cell voltages associated with a battery management system, in an embodiment according to the present invention.

FIG. 2 illustrates a timing diagram 200 of examples of cell voltages associated with the battery management system 100A in FIG. 1A or 100B in FIG. 1B, in an embodiment according to the present invention. FIG. 2 is described in combination with FIG. 1A and FIG. 1B. In one embodiment, a cell voltage $V_{102\_1}$ of the battery cell 102_1, a cell voltage $V_{102\_2}$ of the battery cell 102_2, and a cell voltage $V_{102\_3}$ of the battery cell 102_3 are compared with a balance threshold $V_{TH}$, a predetermined overcharge-released threshold $V_{OVR}$, and a predetermined overcharge threshold $V_{OV}$. In one embodiment, the predetermined overcharge-released threshold $V_{OVR}$ is greater than the balance threshold $V_{TH}$ and is less than the predetermined overcharge threshold $V_{OV}$ ($V_{TH}<V_{OVR}<V_{OV}$). In the example of FIG. 2, the battery management system 100A or 100B operates in normal states (or charge states) during time intervals T1-T5 and T10-T11, and operates in charging prohibition states during time intervals T6-T9 and after time interval T11.

More specifically, as shown in FIG. 2, in the time interval T1, cell voltages $V_{102\_1}$, $V_{102\_2}$ and $V_{102\_3}$ increase. The cell voltage $V_{102\_1}$ of the battery cell 102_1 is greater than the balance threshold $V_{TH}$ near the end of the time interval T1. Thus, the balancing circuit 122 balances the battery cells 102_1-102_3 by decreasing a rate of voltage increase of the battery cell 102_1, e.g., turning on a bypass circuit coupled in parallel with the battery cell 102_1.

Following the time interval T1, the cell voltages $V_{102\_1}$, $V_{102\_2}$ and $V_{102\_3}$ continue to increase. In the time interval T4, the voltage $V_{102\_2}$ of the battery cell 102_2 increases to exceed the balance threshold $V_{TH}$. In response, the balancing circuit 122 decreases a rate of voltage increase of the battery cell 102_2.

At the end of the time interval T5, the voltage $V_{102\_1}$ of the battery cell 102_1 is greater than the predetermined overcharge threshold $V_{OV}$, and thus the charge controlling unit 114 disables charging of the battery cells 102_1-102_3. Following the time interval T5, the cell voltage $V_{102\_3}$ of the battery cell 102_3 can remain unchanged. In addition, due to the discharging of the battery cells 102_1 and 102_2 performed by the balancing circuit 122, the voltages $V_{102\_1}$ and $V_{102\_2}$ decrease. At the end of the time interval T8, the voltage $V_{102\_2}$ of the battery cell 102_2 decreases to the balance threshold $V_{TH}$, and the balancing circuit 122 stops discharging the battery cell 102_2. Thus, during the time interval T9, the voltage $V_{102\_2}$ can remain unchanged. The voltage $V_{102\_1}$ of the battery cell 102_1 continues to decrease in time interval T9. Near the end of the time interval T9, the voltage $V_{102\_1}$ of the battery cell 102_1 falls to the predetermined overcharge-released threshold $V_{OVR}$, and therefore the charge controlling unit 114 enables charging of the battery cells 102_1-102_3 again. In time interval T10, the cell voltages $V_{102\_1}$, $V_{102\_2}$ and $V_{102\_3}$ increase gradually. The balancing circuit 122 balances the battery cells 102_1 and 102_2 by decreasing their rates of voltage increase.

At the end of the time interval T10, the voltages $V_{102\_1}$, $V_{102\_2}$ and $V_{102\_3}$ are all greater than the balance threshold $V_{TH}$, and therefore the balancing circuit 122 stops balancing the battery cells 102_1-102_3. Since the charging process for the battery cells 102_1-102_3 is continued, the voltages $V_{102\_1}$, $V_{102\_2}$ and $V_{102\_3}$ increase. At the end of the time interval T11, the battery cells 102_1-102_3 are fully charged, and therefore the charging of the battery cells 102_1-102_3 is terminated.

Figure 3:
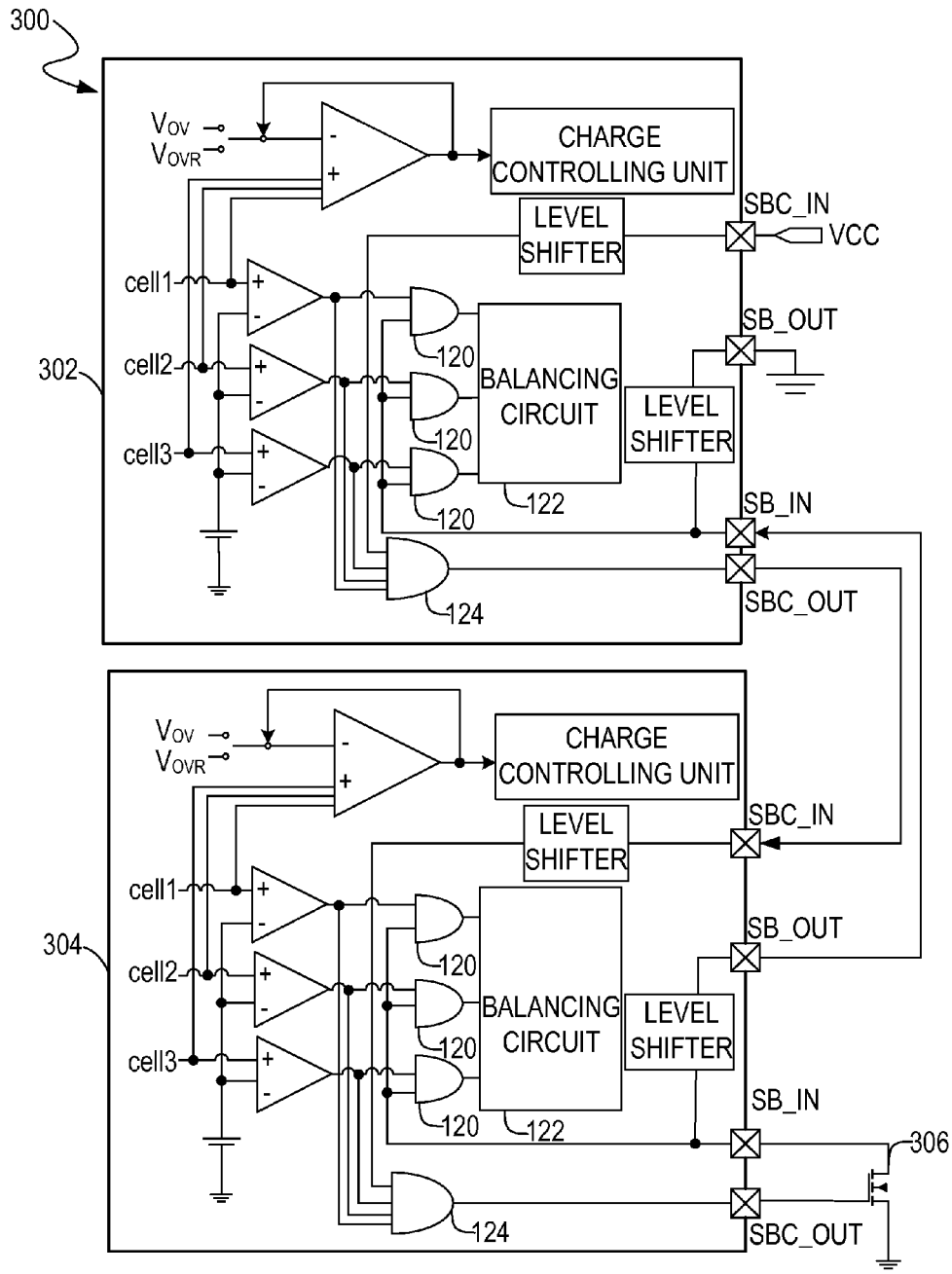
FIG. 3 illustrates a circuit diagram of an example of a battery management system, in an embodiment according to the present invention.

FIG. 3 illustrates a circuit diagram of an example of a battery management system 300, in an embodiment according to the present invention. The FIG. 3 is described in combination with FIG. 1A and FIG. 1B. In the example of FIG. 3, the battery management system 300 includes modules 302 and 304 coupled in series. The number of modules is set to two for illustrative purpose herein. However, the battery management system 300 may include another number of series-coupled modules. The modules 302 and 304 in FIG. 3 are similar to the battery management system 100A in FIG. 1A or the battery management system 100B in FIG. 1B. In one embodiment, the module 302 can be integrated as a chip 302, and the module 304 can be integrated as a chip 304. In another embodiment, the modules 302 and 304 can be integrated in single chip.

As shown in FIG. 3, an SBC_IN terminal of the chip 302 receives a voltage VCC. An SB_OUT terminal of the chip 302 is coupled to ground. An SB_IN terminal of the chip 302 is coupled to an SB_OUT terminal of the chip 304 and receives a signal from the SB_OUT terminal of the chip 304. An SBC_OUT terminal of the chip 302 is coupled to an SBC_IN terminal of the chip 304 and provides a signal to the SBC_IN terminal of the chip 304. A switch 306 is coupled between an SB_IN terminal of the chip 304 and ground. In one embodiment, the switch 306 can be, but is not limited to, a metal-oxide-semiconductor field-effect transistor (MOSFET). A conductance status of the switch 306 is determined by its gate-to-source voltage, which is determined by a signal from an SBC_OUT terminal of the chip 304.

In operation, if cell voltages of the battery cells managed by the chips 302 and 304 are all greater than a balance threshold $V_{TH}$, then a balancing circuit 122 of the chip 302 stops balancing the battery cells of the chip 302, and a balancing circuit 122 of the chip 304 stops balancing the battery cells of the chip 304. More specifically, when cell voltages of the battery cells of the chip 302 are greater than the balance threshold $V_{TH}$, the SBC_OUT terminal of the chip 302 outputs a logic-high signal generated from the balancing prohibition unit 124 in the chip 302 to the SBC_IN terminal of the chip 304. When cell voltages of the battery cells of the chip 304 are also greater than the balance threshold $V_{TH}$, the SBC_OUT terminal of the chip 304 can output a logic-high signal generated by the balancing prohibition unit 124 in the chip 304. Therefore, the switch 306 is turned on. The SB_IN terminal of the chip 304 is pulled down to ground. The balancing circuit 122 of the chip 304 receives logic-low signals from the AND gates 120 of the chip 304 and stops balancing the battery cells of the chip 304. At the same time, the SB_IN terminal of the chip 302 can receive a logic-low signal from the SB_OUT terminal of the chip 304. The balancing circuit 122 of the chip 302 receives logic-low signals from the AND gates 120 of the chip 302 and stops balancing the battery cells of the chip 302.

Figure 4:
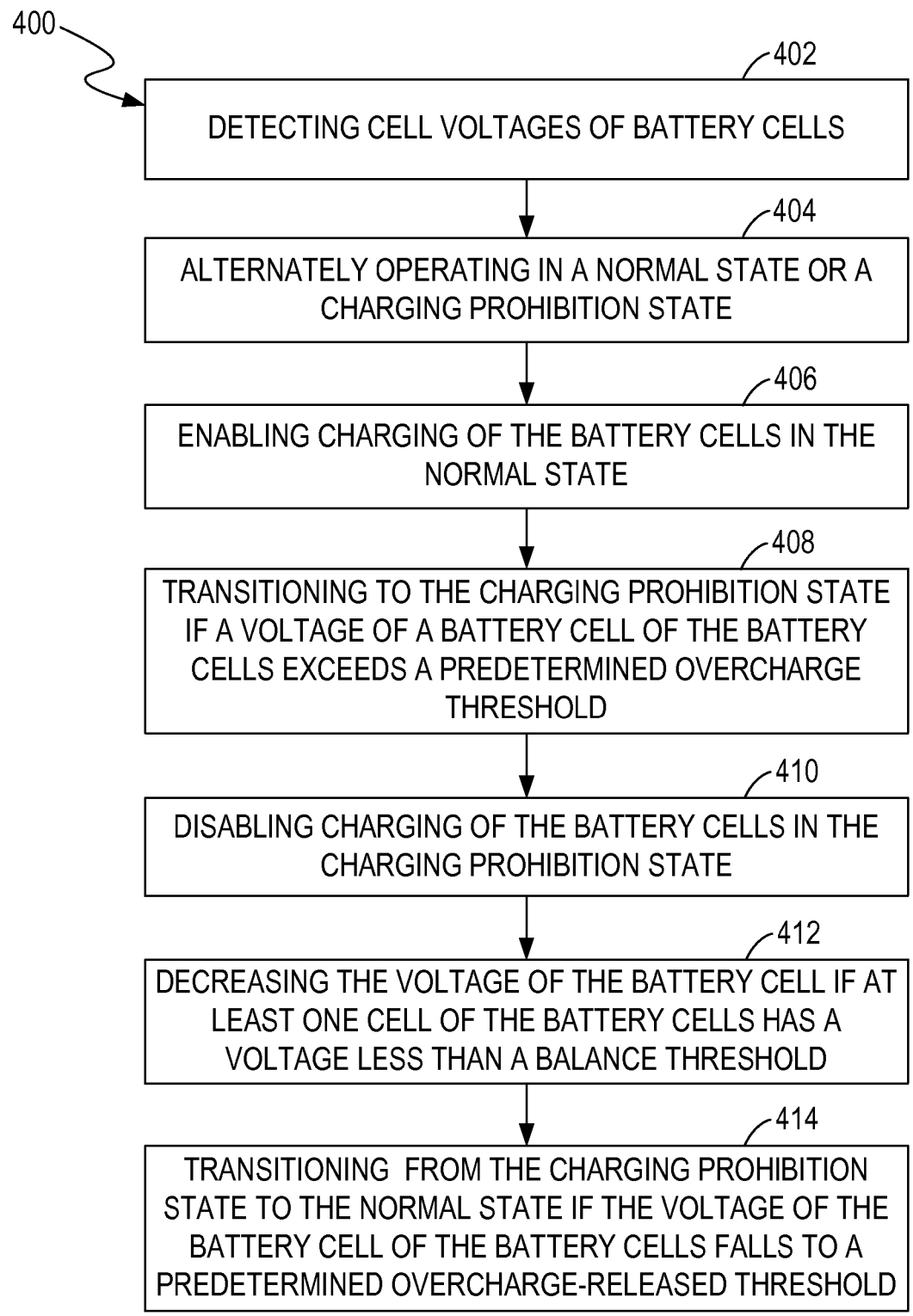
FIG. 4 illustrates a flowchart of examples of operations performed by a battery management system, in an embodiment according to the present invention.

FIG. 4 illustrates a flowchart of examples of operations performed by the battery management system 100A in FIG. 1A or 100B in FIG. 1B, in an embodiment according to the present invention. FIG. 4 is described in combination with FIG. 1A, FIG. 1B, FIG. 2, and FIG. 3. Although specific steps are disclosed in FIG. 4, such steps are examples. That is, the present invention is well suited to perform various other steps or variations of the steps recited in FIG. 4.

In block 402, the detecting circuitry 104 detects cell voltages of battery cells 102_1-102_N in a battery pack.

In block 404, the control circuitry 106 alternately operates in a normal state or a charging prohibition state.

In block 406, the control circuitry 106 enables charging of the battery cells 102_1-102_N in the normal state.

In block 408, the control circuitry 106 transitions to the charging prohibition state if a voltage $V_{102\_K}$ of a battery cell 102_K (K=1, 2, ... , N) of the battery cells 102_1-102_N exceeds a predetermined overcharge threshold $V_{OV}$.

In block 410, the control circuitry 106 disables charging of the battery cells 102_1-102_N in the charging prohibition state.

In block 412, the control circuitry 106 decreases the voltage $V_{102\_K}$ of the battery cell 102_K if at least one cell of the battery cells 102_1-102_N has a voltage less than a balance threshold $V_{TH}$.

In block 414, the control circuitry 106 transitions from the charging prohibition state to the normal state if the voltage $V_{102\_K}$ of the battery cell 102_K falls to a predetermined overcharge-released threshold $V_{OVR}$.

In summary, embodiments according to the present invention provide battery management systems for controlling the charging and balancing of battery cells, and for protecting the battery cells from an overcharge condition. When the battery cells are being charged, the battery management system provides an overcharge threshold $V_{OV}$ for detecting an overcharge condition. If a cell voltage of a battery cell exceeds the overcharge threshold $V_{OV}$, the battery management system can halt the charging of all the battery cells and let at least some of the battery cells with higher cell voltages be discharged. When the cell voltage of that battery cell decreases from the overcharge threshold $V_{OV}$ to an overcharge-released threshold $V_{OVR}$ ($V_{OVR}<V_{OV}$), the battery management system enables/activates the charging of the battery cells such that all the cell voltages increase again. Accordingly, the battery cells are protected from the overcharge condition. Furthermore, the balancing of the battery cells is performed whether the charging of the battery cells is activated or halted, and therefore the efficiency of the changing and balancing of the battery cells is enhanced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system comprising:
   detecting circuitry that detects cell voltages of a first plurality of battery cells of a battery pack; and
   first control circuitry, coupled to said detecting circuitry, that selectively operates in a state that is one of a normal state and a charging prohibition state based on a predetermined overcharge threshold, a predetermined overcharge-released threshold less than said predetermined overcharge threshold, and a balance threshold less than said predetermined overcharge-released threshold,
   wherein in said normal state, charging of said first plurality of battery cells is enabled and each of said cell voltages keeps increasing during the entire period of said normal state, said first control circuitry balances said first plurality of battery cells by decreasing a rate of voltage increase of a battery cell of said first plurality of battery cells if a voltage of said battery cell of said first plurality of battery cells is greater than said balance threshold, and said first control circuitry transitions from said normal state to said charging prohibition state if a first voltage of a first battery cell of said first plurality of battery cells exceeds said predetermined overcharge threshold,
   wherein in said charging prohibition state, charging of said first plurality of battery cells is disabled, and if a second battery cell of said first plurality of battery cells has a voltage greater than said balance threshold and a third battery cell of said first plurality of battery cells has a voltage less than said balance threshold, then said first control circuitry enables discharging of said first battery cell and said second battery cell,
   and wherein in said charging prohibition state, if said first voltage of said first battery cell falls to said predetermined overcharge-released threshold, then said first control circuitry transitions from said charging prohibition state to said normal state and enables charging of said first plurality of battery cells.

2. The system as claimed in claim 1, wherein said first control circuitry comprises:
   a comparator, coupled to said detecting circuitry, that compares said first voltage of said first battery cell with said predetermined overcharge threshold and generates an output signal; and
   a charge controlling unit, coupled to said comparator, that controls charging of said first plurality of battery cells based on said output signal.

3. The system as claimed in claim 2, wherein if said first voltage of said first battery cell is greater than said predetermined overcharge threshold, then said output signal controls said charge controlling unit to disable charging of said first plurality of battery cells.

4. The system as claimed in claim 1, wherein said first control circuitry comprises:
   a balancing circuit that balances said first plurality of battery cells in said normal state by decreasing said rate of voltage increase of said battery cell of said first plurality of battery cells, and that balances said first plurality of battery cells in said charging prohibition state by decreasing said first cell voltage and said second cell voltage; and
   a balancing prohibition unit, coupled to said balancing circuit, that controls said balancing circuit based on comparison between said cell voltages of said first plurality of battery cells and said balance threshold.

5. The system as claimed in claim 1, wherein said first plurality of battery cells are coupled to each other in series.

6. A method for controlling charging of a battery pack, said method comprising:
   detecting cell voltages of a first plurality of battery cells in said battery pack;
   controlling first control circuitry, coupled to said first plurality of battery cells, to selectively operate in a state that is one of a normal state and a charging prohibition state based on a predetermined overcharge threshold, a predetermined overcharge-released threshold less than said predetermined overcharge threshold, and a balance threshold less than said predetermined overcharge-released threshold;
   charging said first plurality of battery cells to keep increasing each of said cell voltages during the entire period of said normal state;
   balancing said first plurality of battery cells in said normal state by decreasing a rate of voltage increase of a battery cell of said first plurality of battery cells if a voltage of said battery cell of said first plurality of battery cells is greater than said balance threshold;
   transitioning from said normal state to said charging prohibition state if a first voltage of a first battery cell of said first plurality of battery cells exceeds said predetermined overcharge threshold;
   disabling charging of said first plurality of battery cells in said charging prohibition state;
   in said charging prohibition state, if a second battery cell of said first plurality of battery cells has a voltage greater than said balance threshold and a third battery cell of said first plurality of battery cells has a voltage less than said balance threshold, then discharging said first battery cell and said second battery cell; and
   controlling said first control circuitry to transition from said charging prohibition state to said normal state if said first voltage of said first battery cell falls to said predetermined overcharge-released threshold.

7. The method as claimed in claim 6, further comprising:
   balancing said first plurality of battery cells in said charging prohibition state by decreasing said first cell voltage and said second cell voltage.

8. A battery pack comprising:
a first plurality of battery cells coupled in series; and
battery management circuitry, coupled to said first plurality of battery cells, wherein said battery management circuitry comprises:
  a detecting circuit that detects cell voltages of said first plurality of battery cells; and
  a first control circuit, coupled to said detecting circuit, that selectively operates in a state that is one of a normal state and a charging prohibition state based on a predetermined overcharge threshold, a predetermined overcharge-released threshold less than said predetermined overcharge threshold, and a balance threshold less than said predetermined overcharge-released threshold,
  wherein in said normal state, charging of said first plurality of battery cells is enabled and each of said cell voltages keeps increasing during the entire period of said normal state, said first control circuit balances said first plurality of battery cells by decreasing a rate of voltage increase of a battery cell of said first plurality of battery cells if a voltage of said battery cell of said first plurality of battery cells is greater than said balance threshold, and said first control circuit transitions from said normal state to said charging prohibition state if a first voltage of a first battery cell of said first plurality of battery cells exceeds said predetermined overcharge threshold,
  wherein in said charging prohibition state, charging of said first plurality of battery cells is disabled, and if a second battery cell of said first plurality of battery cells has a voltage greater than said balance threshold and a third battery cell of said first plurality of battery cells has a voltage less than said balance threshold, then said first control circuit enables discharging of said first battery cell and said second battery cell,
  and wherein in said charging prohibition state, if said first voltage of said first battery cell falls to said predetermined overcharge-released threshold, then said first control circuit transitions from said charging prohibition state to said normal state and enables charging of said first plurality of battery cells.

9. The battery pack as claimed in claim 8, wherein said first control circuit comprises:
  a comparator, coupled to said detecting circuit, that compares said first voltage of said first battery cell with said predetermined overcharge threshold and generates an output signal; and
  a charge controlling unit, coupled to said comparator, that controls charging of said first plurality of battery cells based on said output signal.

10. The battery pack as claimed in claim 9, wherein if said first voltage of said first battery cell is greater than said predetermined overcharge threshold, then said output signal controls said charge controlling unit to disable charging of said first plurality of battery cells.

11. The battery pack as claimed in claim 8, wherein said first control circuit comprises:
  a balancing circuit that balances said first plurality of battery cells in said normal state by decreasing said rate of voltage increase of said battery cell of said first plurality of battery cells, and that balances said first plurality of battery cells in said charging prohibition state by decreasing said first cell voltage and said second cell voltage; and
  a balancing prohibition unit, coupled to said balancing circuit, that controls said balancing circuit based on comparison between said cell voltages of said first plurality of battery cells and said balance threshold.

12. The system as claimed in claim 1, wherein said first control circuitry disables charging and discharging of said third battery cell in said charging prohibition state, and wherein in said charging prohibition state, if said voltage of said second battery cell decreases to said balance threshold, then said first control circuitry disables charging and discharging of said second battery cell.

13. The method as claimed in claim 6, further comprising:
  disabling charging and discharging of said third battery cell in said charging prohibition state; and
  disabling charging and discharging of said second battery cell if said voltage of said second battery cell decreases to said balance threshold in said charging prohibition state.

14. The battery pack as claimed in claim 8, wherein said first control circuit disables charging and discharging of said third battery cell in said charging prohibition state, and wherein in said charging prohibition state, if said voltage of said second battery cell decreases to said balance threshold, then said first control circuit disables charging and discharging of said second battery cell.

15. The system as claimed in claim 1, wherein said first control circuitry comprises:
  an input terminal that receives an input signal, indicative of a status of cell voltages of a second plurality of battery cells, from second control circuitry;
  an output terminal that provides an output signal, indicative of said status of said cell voltages of said second plurality of battery cells and a status of said cell voltages of said first plurality of battery cells, to said second control circuitry; and
  a balancing prohibition unit, coupled to said input and output terminals, that receives said input signal and a set of signals indicative of statuses of said cell voltages of said first plurality of battery cells,
  wherein if said input signal indicates that said cell voltages of said second plurality of battery cells are greater than said balance threshold and if said set of signals indicate that said cell voltages of said first plurality of battery cells are greater than said balance threshold, then said balance prohibition unit disables balancing of said first plurality of battery cells and controls said output signal to disable balancing of said second plurality of battery cells.

16. The system as claimed in claim 15, wherein said balancing prohibition unit controls a conductance status of a switch coupled to said output terminal and a balancing circuit that balances said first plurality of battery cells, and wherein said conductance status of said switch determines whether balancing of said first and second pluralities of battery cells is disabled.

17. The method as claimed in claim 6, further comprising:
  receiving an input signal, indicative of a status of cell voltages of a second plurality of battery cells, from second control circuitry coupled to said second plurality of battery cells;
  providing an output signal, indicative of a status of said cell voltages of said first plurality of battery cells and said status of said cell voltages of said second plurality of battery cells, to said second control circuitry; and
  if said cell voltages of said first plurality of battery cells are greater than said balance threshold and if said input signal indicates that said cell voltages of said second plurality of battery cells are greater than said balance threshold, then controlling said first control circuitry to disable balancing of said first plurality of battery cells and controlling said output signal to disable balancing of said second plurality of battery cells.

18. The method as claimed in claim 17, further comprising:
disabling balancing of said first and second pluralities of battery cells by controlling a conductance status of a switch, wherein said switch is coupled to an output terminal that provides said output signal and coupled to a balancing circuit that balances said first plurality of battery cells.

19. The battery pack as claimed in claim 8, wherein said first control circuit comprises:
an input terminal that receives an input signal, indicative of a status of cell voltages of a second plurality of battery cells, from second control circuitry;
an output terminal that provides an output signal, indicative of said status of said cell voltages of said second plurality of battery cells and a status of said cell voltages of said first plurality of battery cells, to said second control circuitry; and
a balancing prohibition unit, coupled to said input and output terminals, that receives said input signal and a set of signals indicative of statuses of said cell voltages of said first plurality of battery cells,
wherein if said input signal indicates that said cell voltages of said second plurality of battery cells are greater than said balance threshold and if said set of signals indicate that said cell voltages of said first plurality of battery cells are greater than said balance threshold, then said balance prohibition unit disables balancing of said first plurality of battery cells and controls said output signal to disable balancing of said second plurality of battery cells.

20. The battery pack as claimed in claim 19, wherein said balancing prohibition unit controls a conductance status of a switch coupled to said output terminal and a balancing circuit that balances said first plurality of battery cells, and wherein said conductance status of said switch determines whether balancing of said first and second pluralities of battery cells is disabled.

* * * * *